US012683691B2

(12) United States Patent
Zhang et al.

(10) Patent No.: US 12,683,691 B2
(45) Date of Patent: Jul. 14, 2026

(54) COHERENT OPTICS CHANNEL DISCOVERY AND PROGRAMMABILITY FOR OPTICAL NETWORKS

(71) Applicant: Cisco Technology, Inc., San Jose, CA (US)

(72) Inventors: Randy Zhang, Manassas, VA (US); Stefano Binetti, Monza (IT); Dirk Schroetter, Frisco, TX (US); Valerio Viscardi, Paderno Dugnano (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 386 days.

(21) Appl. No.: 18/458,413

(22) Filed: Aug. 30, 2023

(65) Prior Publication Data

US 2025/0080231 A1 Mar. 6, 2025

(51) Int. Cl.
H04B 10/572 (2013.01)
H04B 10/079 (2013.01)

(52) U.S. Cl.
CPC ..... H04B 10/572 (2013.01); H04B 10/07957 (2013.01)

(58) Field of Classification Search
CPC ............. H04B 10/572; H04B 10/07957; H04J 14/0246; H04J 14/025; H04J 14/0282; H04J 14/0252; H04J 14/0247; H04J 14/0278; H04J 14/0204; H04J 14/0209; H04J 14/0223; H04J 14/0238; H04J 14/0245; H04J 14/0241; H04J 14/0242; H04J 14/0279; H04J 14/028
See application file for complete search history.

(56) References Cited

U.S. PATENT DOCUMENTS

| | | | |
|---|---|---|---|
| 8,045,853 B2 | 10/2011 | Gerstel et al. | |
| 10,447,551 B1 | 10/2019 | Zhang et al. | |
| 2012/0128373 A1* | 5/2012 | Smith | H04J 14/0282 |
| | | | 398/158 |
| 2012/0144445 A1* | 6/2012 | Bonta | H04L 65/762 |
| | | | 725/116 |
| 2013/0148109 A1* | 6/2013 | Bei | H04B 10/071 |
| | | | 356/73.1 |
| 2016/0261362 A1 | 9/2016 | Ojima et al. | |
| 2017/0279665 A1* | 9/2017 | Mukai | H04J 14/02122 |
| 2017/0288773 A1 | 10/2017 | Stiscia et al. | |
| 2023/0239051 A1 | 7/2023 | Rao et al. | |

FOREIGN PATENT DOCUMENTS

| | | |
|---|---|---|
| CN | 113922915 A | 1/2022 |
| CN | 115173937 A | 10/2022 |

OTHER PUBLICATIONS

CIENA, "What is ROADM?," retrieved from https://www.ciena.com/insights/what-is/what-Is-roadm.html, Aug. 1, 2023, 5 pages.

* cited by examiner

*Primary Examiner* — Hibret A Woldekidan

(74) *Attorney, Agent, or Firm* — Edell, Shapiro & Finnan, LLC

(57) ABSTRACT
In one example embodiment, a wavelength of a first network node is identified for communication over a network with a second network node by sweeping wavelengths of the second network node. A wavelength of the second network node is adjusted based on the wavelength of the first network node to align wavelengths of the first network node and the second network node for communication.

20 Claims, 11 Drawing Sheets

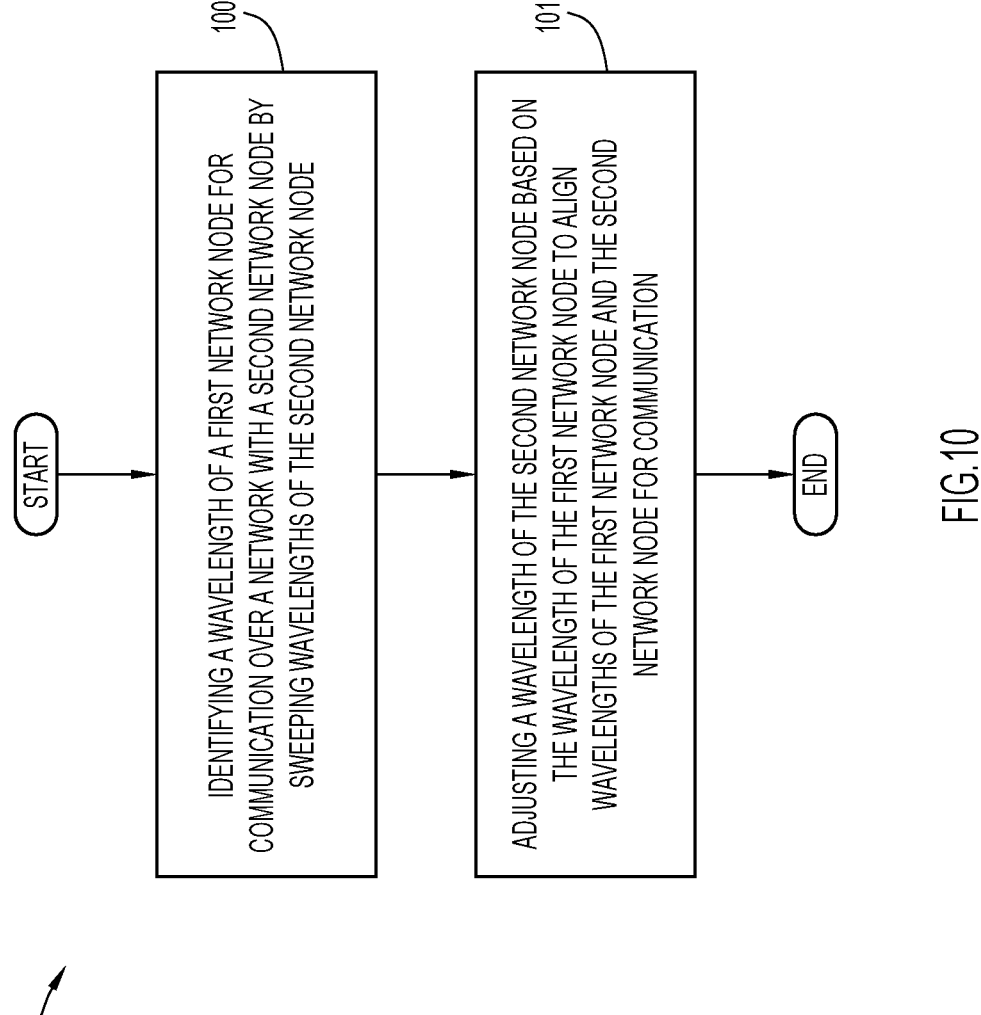

START

IDENTIFYING A WAVELENGTH OF A FIRST NETWORK NODE FOR COMMUNICATION OVER A NETWORK WITH A SECOND NETWORK NODE BY SWEEPING WAVELENGTHS OF THE SECOND NETWORK NODE
1005

ADJUSTING A WAVELENGTH OF THE SECOND NETWORK NODE BASED ON THE WAVELENGTH OF THE FIRST NETWORK NODE TO ALIGN WAVELENGTHS OF THE FIRST NETWORK NODE AND THE SECOND NETWORK NODE FOR COMMUNICATION
1010

END

COHERENT OPTICS CHANNEL DISCOVERY AND PROGRAMMABILITY FOR OPTICAL NETWORKS

TECHNICAL FIELD

The present disclosure relates to networking.

BACKGROUND

Digital coherent optics (DCO) provide tunable C band signals (4.8 Terahertz bandwidth, approximately from 191 to 196 Terahertz) and L band signals (4.8 Terahertz bandwidth, approximately from 186 to 191 Terahertz) between a pair of routers in routed optical networking. A common deployment issue is mismatching of optical configuration parameters between two peers, namely the wavelength. This adds to deployment time and cost, and prevents initiating additional protocols and services. If an initial channel can be quickly established, further and more sophisticated diagnostic and peer discovery can occur using the channel.

Lawful intercept (LI) that uses dense wavelength-division multiplexing (DWDM) (pluggable) interfaces may connect to a split port and is often automatically able to lock-in to (for receive only) the signal coming from the tapped port. The current LI approach with pluggable wide-band optics receivers is plug and forget since no configuration is involved (because the optics receivers are wideband) and a third party applies the intercept configuration to the specific intercept box. A DWDM coherent port involves configuration provided either by a service provider (SP) (in a protected box) or by the third party which adds time and cost.

BRIEF DESCRIPTION OF THE DRAWINGS

FIG. 10 is a flowchart of a generalized method for controlling operation of an optical network, according to an example embodiment.

DETAILED DESCRIPTION

Overview

Figure 1:
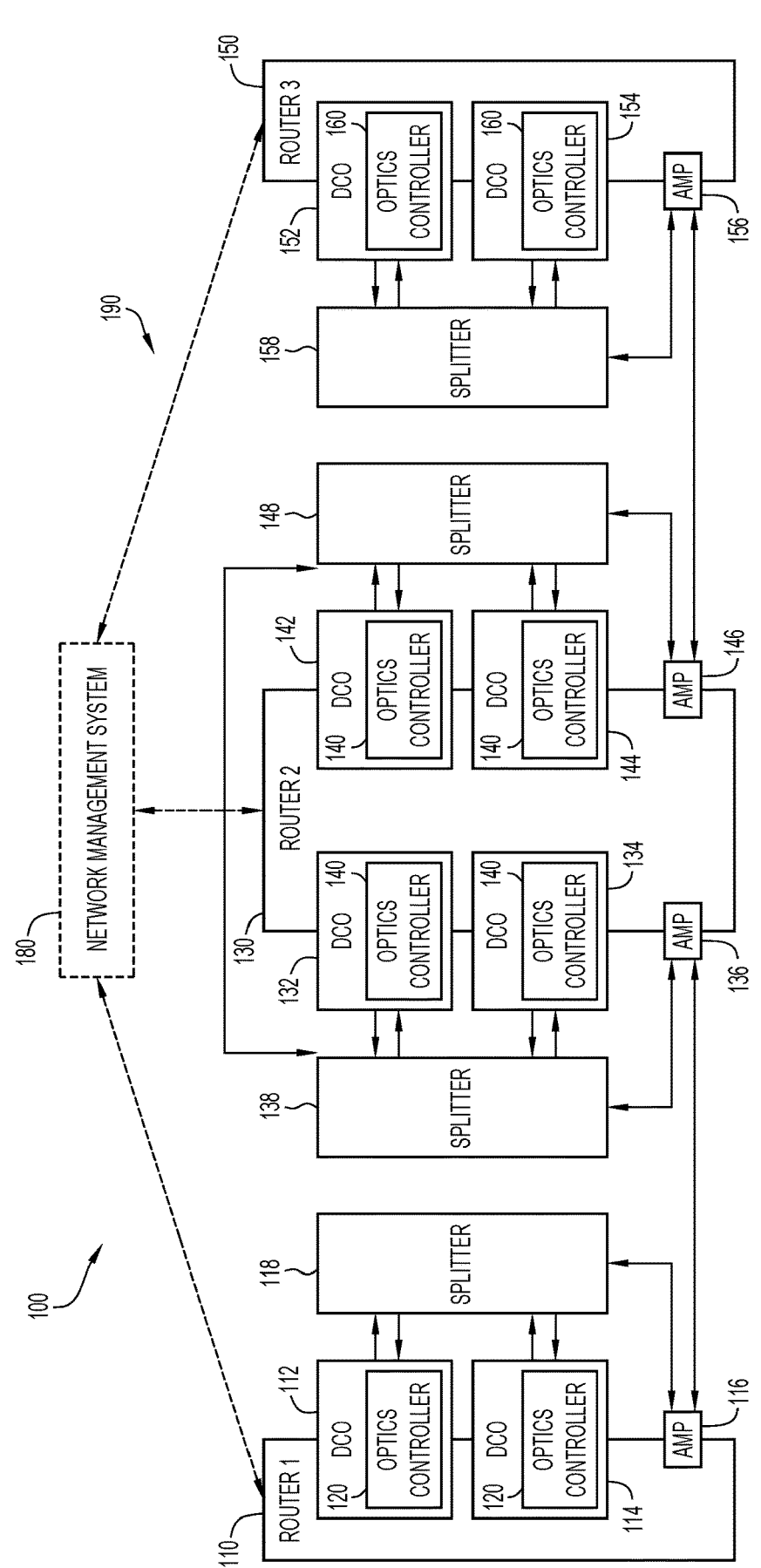
FIG. 1 is a block diagram of an example environment in which optical network operations using splitters may be implemented, according to an example embodiment.

In one example embodiment, a wavelength of a first network node is identified for communication over a network with a second network node by sweeping wavelengths of the second network node. A wavelength of the second network node is adjusted based on the wavelength of the first network node to align wavelengths of the first network node and the second network node for communication.

Example Embodiments

Routers connected over digital coherent optics (DCO) may encounter a mismatch of optical parameters that may prevent establishment of a link during deployment. An example embodiment provides peer discovery to deliver Reconfigurable Optical Add/Drop Multiplexer (ROADM)-like programmability in networks where such functionality is unavailable. This functionality includes addition and/or removal of wavelengths at a site with a capability to adjust or reconfigure the wavelengths to add, drop, and/or pass through in response to changes in traffic patterns. This reduces deployment time and quickly establishes an initial communication channel for further and more sophisticated diagnostics.

An example embodiment creates a Reconfigurable Optical Add/Drop Multiplexer (ROADM)-like capability that accelerates deployment in a number of use cases (e.g., access and aggregation networks, fixed filters, ROADM networks, etc.). The example embodiment may provide the ROADM-like functionality in access and aggregation networks, where ROADM-like functionality may be beneficial but not often available through splitters in these specific topologies. The example embodiment is also applicable to filter-based and ROADM networks. The programmability of the example embodiment provides significant enhancements to various use cases. By way of example, the example embodiment may apply to coherent applications in use cases where a signal meets an optical signal-to-noise ratio (OSNR). In use cases where there is no optical spectrum analyzer (OSA) functionality available (e.g., no ROADM present to provide this functionality with an integrated optical channel monitoring system), the example embodiment provides a mechanism that leverages capability of the optics to simplify wavelength routing provisioning without traffic impact.

An example embodiment provides a mechanism of discovery and programmability to deliver a software Reconfigurable Optical Add/Drop Multiplexer (ROADM)-like functionality (e.g., in a splitter-based environment) to provide ROADM-like flexibility without the complexity and cost of a ROADM for access and aggregation networks. This cases deployment and helps prevent traffic affecting configuration errors. This mechanism may also be applied to fixed filter and ROADM networks to infer correct patching and provide connection verification.

An example embodiment automatically discovers coherent optics parameters (e.g., an available wavelength spectrum) to program a network to deliver Reconfigurable Optical Add/Drop Multiplexer (ROADM)-like functionality that is often unavailable in many networks. Automated digital coherent optics (DCO) receiver sweeping is employed to discover peer optics parameters that are applicable to filter and splitter based scenarios.

An example embodiment provides peer discovery and correction to identify the presence of a match between a configuration parameter and corresponding utilized channel, and to quickly initiate the initial communication channel between two peers of a digital coherent optics (DCO) signal. The example embodiment leverages existing hardware capability, and does not involve any new tones, signal, external controllers, or control plane protocols. This significantly simplifies customer operation and troubleshooting for deployment and other use cases.

An example embodiment finds an initial matching wavelength (channel) between two digital coherent optics (DCO) in routers (as opposed to ascertaining a correlation between a router port and filter port). The example embodiment relies on existing hardware features of a DCO receiver to perform channel power sweeping and wavelength matching. Wavelength correction is subsequently performed when a detected channel does not match the channel indicated in a configuration. This enables the initial channel to be established in order for further discovery to occur. The example embodiment avoids a hardware change, a control protocol, and external controllers.

An example embodiment performs analog sweeping for a wavelength regardless of bit rate, and may be applied for point-to-point and broadcast domains. The example embodiment provides a Reconfigurable Optical Add/Drop Multiplexer (ROADM)-like functionality (flexibility) and operation using splitters without the complexity and cost of a ROADM in the access and aggregation networks and also avoiding the limitations of fixed filters. This simplifies wavelength provisioning and prevents possible traffic affecting configuration errors.

While the present embodiments are described with respect to optical networks with filter or splitter arrangements, it will be appreciated that the present embodiments may be applied to various other networks or network arrangements (e.g., with or without Reconfigurable Optical Add/Drop Multiplexers (ROADMs), etc.) to verify and/or provision optical channels in substantially the same manner described below.

FIG. 1 illustrates a block diagram of an example environment 100 in which an embodiment presented herein may be implemented. The environment employs digital coherent optics (DCO) modules. A DCO module is an optical module that can be coupled to, or pluggable and inserted into, routers to provide tunable C band (4.8 Terahertz bandwidth, approximately from 191 to 196 Terahertz) or L band (4.8 Terahertz bandwidth, approximately from 186 to 191 Terahertz) wavelength transmission. A pair of routers connected via DCO modules becomes point to point peers over a common wavelength that can be carried over dark fibers, with or without amplifiers, or over a wavelength add/drop network. For example, environment 100 illustrates pairs of DCO modules connecting three routers over two splitters to form peer to peer relationships.

By way of example, environment 100 includes an optical network 190 including routers 110, 130, and 150 (e.g., router 1, router 2, and router 3 as viewed in FIG. 1). Routers 110, 130, and 150 may be implemented by any conventional or other routers capable of routing optical signals. Router 110 includes, or is coupled to, digital coherent optics (DCO) modules or transceivers 112, 114, an amplifier 116, and an optics controller 120 (e.g., including a photonic controller, a digital signal processor, an Ethernet controller, etc.) within each of the DCO modules. The DCO modules may be implemented by any conventional or other optics modules, and transmit and receive optical signals for router 110. DCO modules 112, 114 are coupled, via ports, to a splitter 118 that splits the incoming or outgoing optical signals for router 110. The splitter may be implemented by any conventional or other optical splitter, and may receive any optical signal wavelength on a port (e.g., the ports are not specific to particular wavelengths). Splitter 118 is coupled to amplifier 116 that amplifies the signals from splitter 118 for transmission on the optical network. Amplifier 116 may be implemented by any conventional or other optical amplifier to provide amplified signals to the routers 110 (receive) and 130 (transmit). The optics controller of the DCO modules may be implemented by any conventional or other optics controller to control the optical components of the DCO modules.

Router 130 includes, or is coupled to, digital coherent optics (DCO) modules or transceivers 132, 134, an amplifier 136, and an optics controller 140 (e.g., including a photonic controller, a digital signal processor, an Ethernet controller, etc.) within each of the DCO modules 132, 134. DCO modules 132, 134 are substantially similar to DCO modules 112, 114 described above, and transmit and receive optical signals for router 130. DCO modules 132, 134 are coupled, via ports, to a splitter 138 that splits the incoming or outgoing optical signals for router 130. Splitter 138 is substantially similar to splitter 118 described above, and may receive any optical signal wavelength on a port (e.g., the ports are not specific to particular wavelengths). Splitter 138 is coupled to amplifier 136 that amplifies the signals from splitter 118 for transmission on the optical network to amplifier 116 of router 110. Amplifier 136 is substantially similar to amplifier 116 described above to provide amplified signals to router 130 (receive) and 110 (transmit).

Router 130 further includes, or is coupled to, digital coherent optics (DCO) modules or transceivers 142, 144, an amplifier 146, and optics controller 140 (e.g., including a photonic controller, a digital signal processor, an Ethernet controller, etc.) within each of the DCO modules 142, 144. DCO modules 142, 144 are substantially similar to DCO modules 112, 114 described above, and transmit and receive optical signals for router 130. DCO modules 142, 144 are coupled to a splitter 148 that splits the incoming or outgoing optical signals for router 130. Splitter 148 is substantially similar to splitter 118 described above, and may receive any optical signal wavelength on a port (e.g., the ports are not specific to particular wavelengths). Splitter 148 is coupled to amplifier 146 that amplifies the signals from splitter 148 for transmission on the optical network to router 150. Amplifier 146 is substantially similar to amplifier 116 described above to provide amplified signals to router 130 (receive) and 150 (transmit). Optics controller 140 of DCO modules 132, 134, 142, 144 is substantially similar to optics controller 120 described above, and controls the optical components of DCO modules 132, 134, 142, 144.

Router 150 includes, or is coupled to, digital coherent optics (DCO) modules or transceivers 152, 154, an amplifier 156, and an optics controller 160 (e.g., including a photonic controller, a digital signal processor, an Ethernet controller, etc.) within each of the DCO modules 152, 154. DCO modules 152, 154 are substantially similar to DCO modules 112, 114 described above, and transmit and receive optical signals for router 150. DCO modules 152, 154 are coupled to a splitter 158 that splits the incoming or outgoing optical signals for router 150. Splitter 158 is substantially similar to splitter 118 described above, and may receive any optical signal wavelength on a port (e.g., the ports are not specific to particular wavelengths). Splitter 158 is coupled to amplifier 156 that amplifies the signals from splitter 158 for transmission on the optical network to amplifier 146 of router 130. Amplifier 156 is substantially similar to amplifier 116 described above to provide amplified signals to router 150 (receive) and 130 (transmit). Optics controller 160 of DCO modules 152, 154 is substantially similar to optics controller 120 described above, and controls the optical components of DCO modules 152, 154.

In the example environment, routers 110, 130, and 150 communicate over optical network 190 using optical channels each associated with a corresponding wavelength. Optical network 190 may include a network management system 180 to control optical network operations (e.g., provisioning wavelengths or channels, etc.). The network management system may be implemented by any conventional or other network management system that monitors and/or controls optical network operation. A user may access the network management system from a user device to monitor, manage, and/or configure the network. For example, the network management system may manage configuration parameters indicating corresponding wavelengths for the optical channels and operations for the network (e.g., channel discovery and provisioning, etc.). Alternatively, the routers may include the configuration parameters and manage the operations (e.g., channel discovery and provisioning, etc.). However, the optical network may include any quantity of components arranged in any fashion (e.g., routers, digital coherent optics (DCO) modules, splitters, amplifiers, optics controllers, network management systems, etc.).

The splitters of environment 100 may receive any optical signal wavelength on a port (e.g., the ports are not specific to particular wavelengths). Thus, in the event of a provisioning error (e.g., wavelengths are not aligned between peer routers, etc.), the splitters may forward data intended for different channels on the same channel or wavelength, thereby corrupting or affecting existing network traffic. Accordingly, an example embodiment enables re-configuring or adjustment of the channels as described below.

Figure 2:
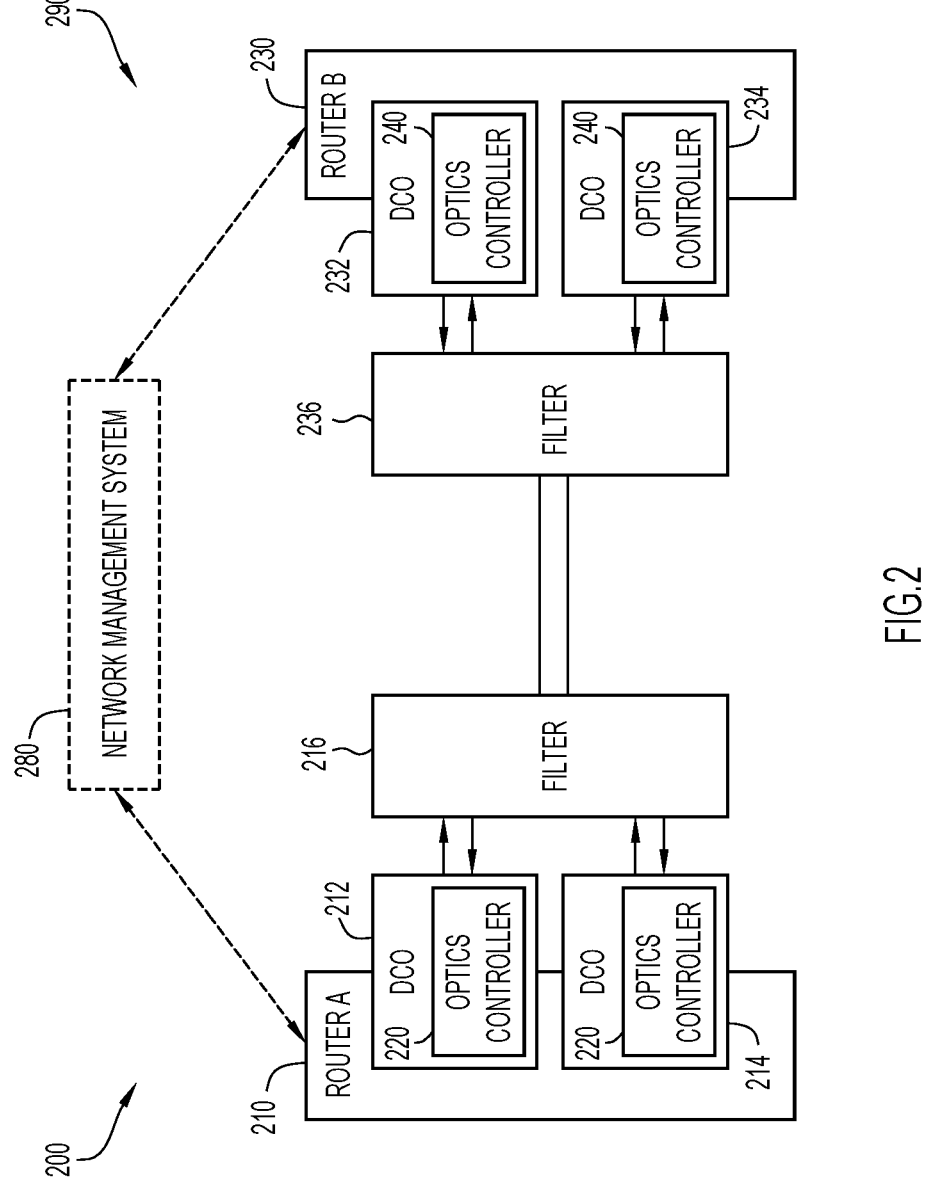
FIG. 2 is a block diagram of another example environment in which optical network operations using filters may be implemented, according to an example embodiment.

FIG. 2 illustrates a block diagram of another example environment 200 in which an embodiment presented herein may be implemented. Environment 200 employs digital coherent optics (DCO) modules inserted into routers to provide tunable C band (4.8 Terahertz bandwidth, approximately from 191 to 196 Terahertz) and L band (4.8 Terahertz bandwidth, approximately from 186 to 191 Terahertz) wavelength transmission. A pair of routers connected via DCO modules becomes point to point peers over a common wavelength that can be carried over dark fibers, with or without amplifiers, or over a wavelength add/drop network. For example, environment 200 illustrates DCO modules paired over optical filters.

By way of example, environment 200 includes an optical network 290 including routers 210 and 230 (e.g., router A and router B as viewed in FIG. 2). Routers 210 and 230 may be implemented by any conventional or other routers capable of routing optical signals. Router 210 includes, or is coupled to, digital coherent optics (DCO) modules or transceivers 212, 214 and an optics controller 220 (e.g., including a photonic controller, a digital signal processor, an Ethernet controller, etc.) within each of the DCO modules 212, 214. The DCO modules are substantially similar to DCO modules

112, 114 described above, and transmit and receive optical signals for router 210. DCO modules 212, 214 are coupled, via ports, to a filter 216 that filters the optical signals (e.g., based on color or wavelength, etc.) for router 210 for transmission on the optical network. The filter may be implemented by any conventional or other optical filter, and is configured to receive a certain optical signal wavelength (or wavelength range) on a corresponding port (e.g., the ports are specific to particular wavelengths (or wavelength ranges)). Filter 216 further filters signals from the network to provide filtered signals to router 210. Optics controller 220 of DCO modules 212, 214 may be implemented by any conventional or other optics controller to control the optical components of DCO modules 212, 214.

Router 230 includes, or is coupled to, digital coherent optics (DCO) modules or transceivers 232, 234 for communication with router 210 and an optics controller 240 (e.g., including a photonic controller, a digital signal processor, an Ethernet controller, etc.) within each of the DCO modules 232, 234. DCO modules 232, 234 are substantially similar to DCO modules 112, 114 described above, and transmit and receive optical signals for router 230. DCO modules 232, 234 are coupled, via ports, to a filter 236 that filters the optical signals (e.g., based on color or wavelength, etc.) for router 230 for transmission on the optical network to filter 216. Filter 236 is substantially similar to filter 216 described above. Filter 236 is configured to receive a certain optical signal wavelength (or wavelength range) on a corresponding port (e.g., the ports are specific to particular wavelengths (or wavelength ranges)). Filter 236 further filters signals from the network to provide filtered signals to router 230. Optics controller 240 of DCO modules 232, 234 may be implemented by any conventional or other optics controller to control the optical components of DCO modules 232, 234.

In the example environment, routers 210 and 230 communicate over optical network 290 using optical channels each associated with a corresponding wavelength. Optical network 290 may include a network management system 280 that controls optical network operation (e.g., provisioning wavelengths or channels, etc.). Network management system 280 may be implemented by any conventional or other network management system that monitors and/or controls optical network operation. A user may access network management system 280 from a user device to monitor, manage, and/or configure the network. For example, network management system 280 may manage configuration parameters indicating corresponding wavelengths for the optical channels and operations for the network (e.g., channel discovery and provisioning, etc.). Alternatively, the routers may include the configuration parameters and manage the operations (e.g., channel discovery and provisioning, etc.). However, optical network 290 may include any quantity of components arranged in any fashion (e.g., routers, digital coherent optics (DCO) modules, filters, optics controllers, network management systems, etc.).

The filters of environment 200 may receive a certain optical signal wavelength (or wavelength range) on a corresponding port (e.g., the ports are specific to particular wavelengths (or wavelength ranges)). Thus, in the event of a provisioning error (e.g., wavelengths are not aligned between peer routers, etc.), the filters may block data from an incorrectly provisioned channel, thereby avoiding corrupting or affecting existing network traffic. However, no new traffic is transmitted over the optical network. Accordingly, an example embodiment enables re-configuring or adjustment of the channels as described below (without replacing or re-arranging the filters).

Figure 3:
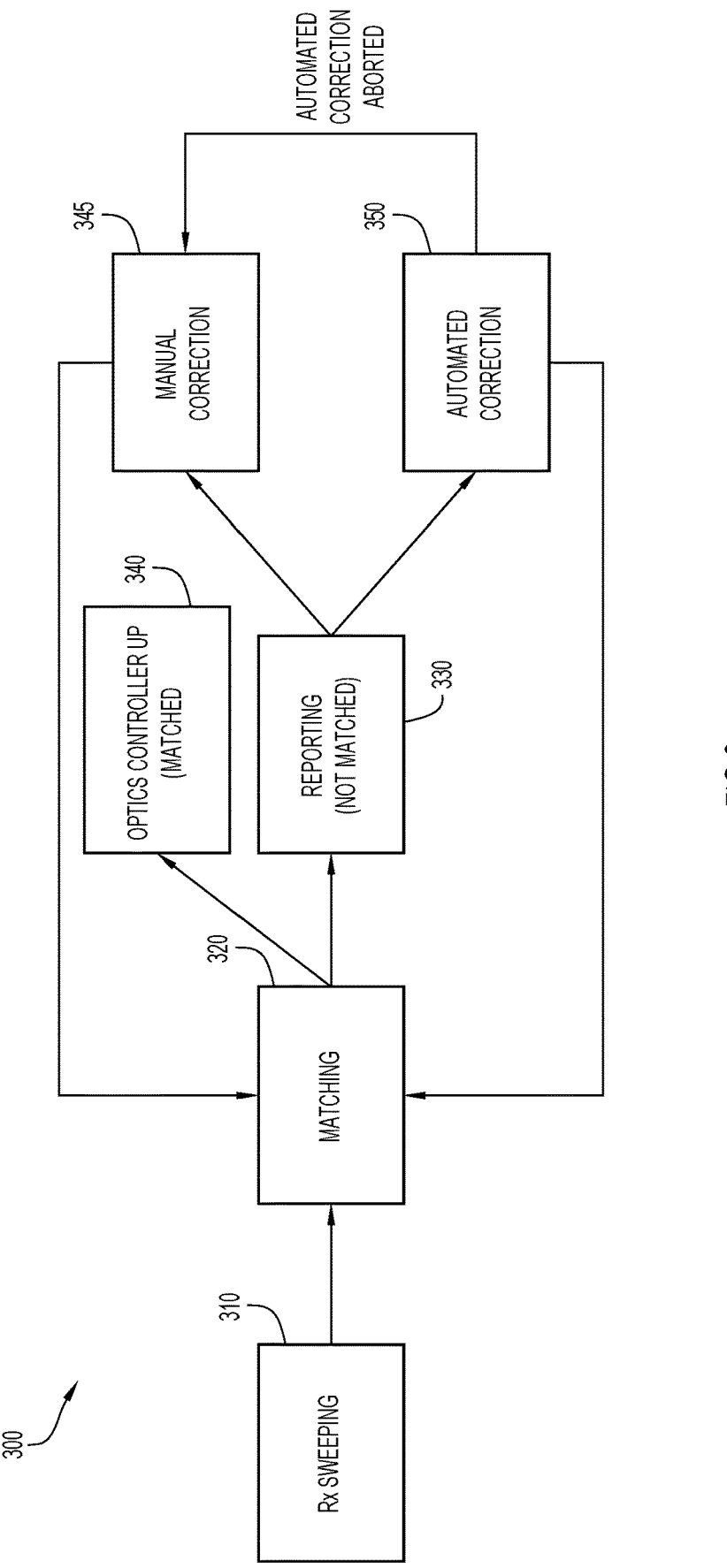
FIG. 3 is a flowchart of a method for discovering and adjusting mismatched optical channels for an optical network, according to an example embodiment.
Figure 4:
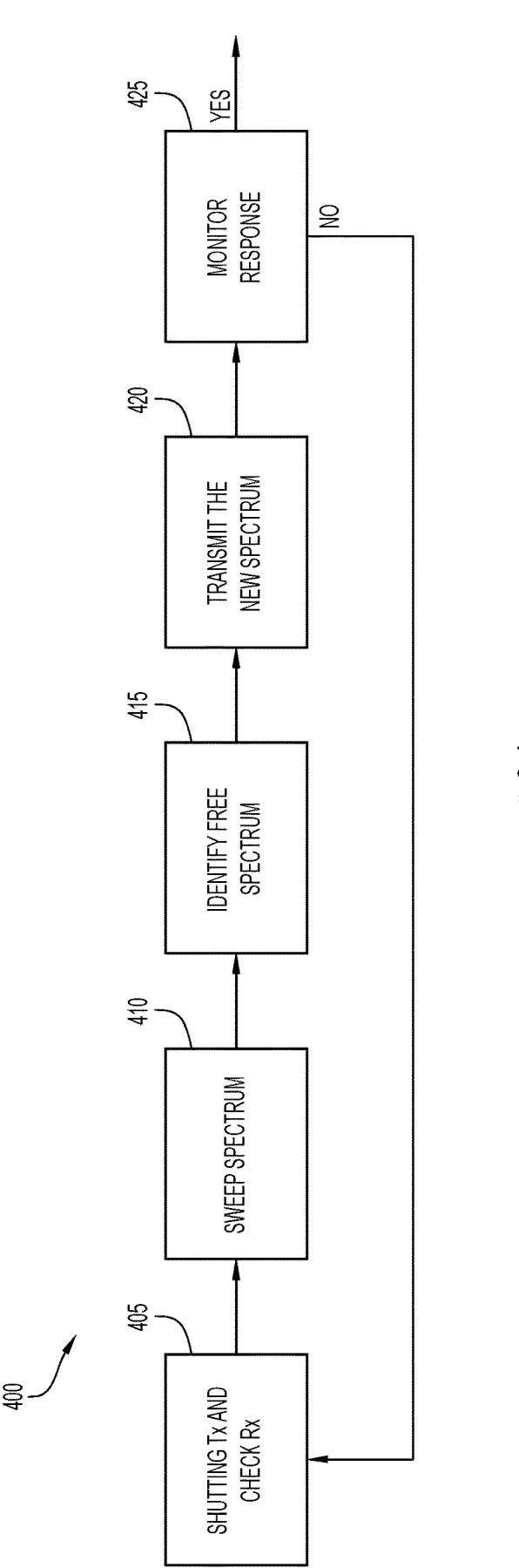
FIG. 4 is a flowchart of a method for identifying an available optical channel, according to an example embodiment.
Figure 5:
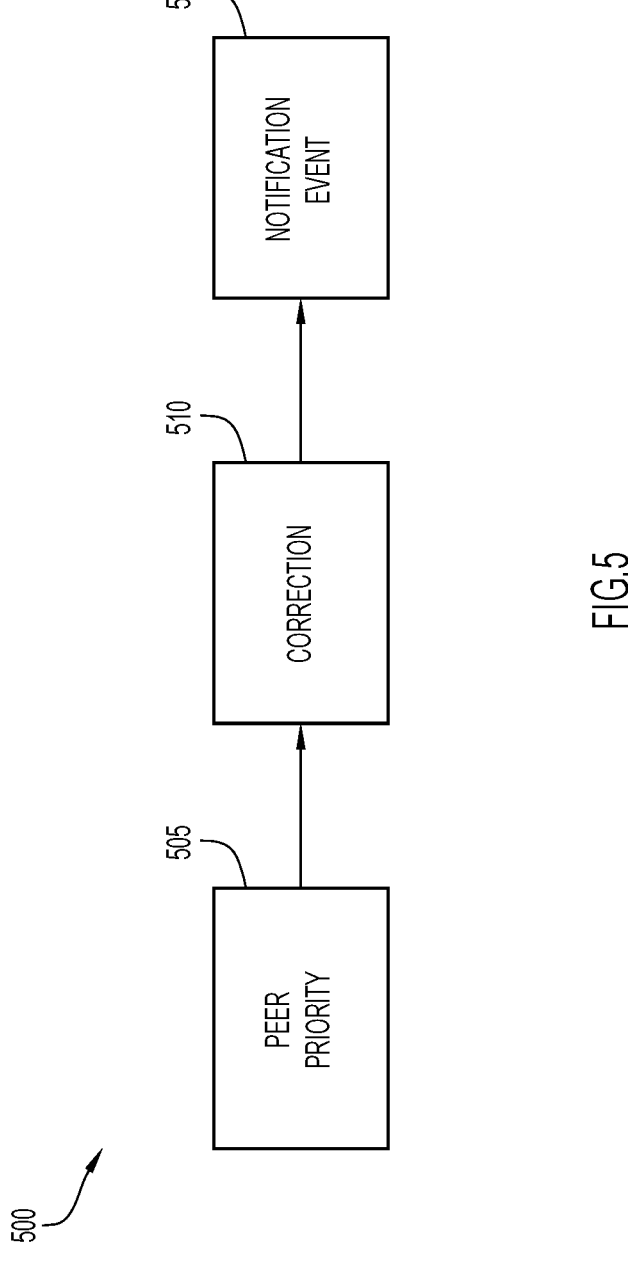
FIG. 5 is a flowchart of a method for adjusting a mismatched optical channel, according to an example embodiment.
Figure 6:
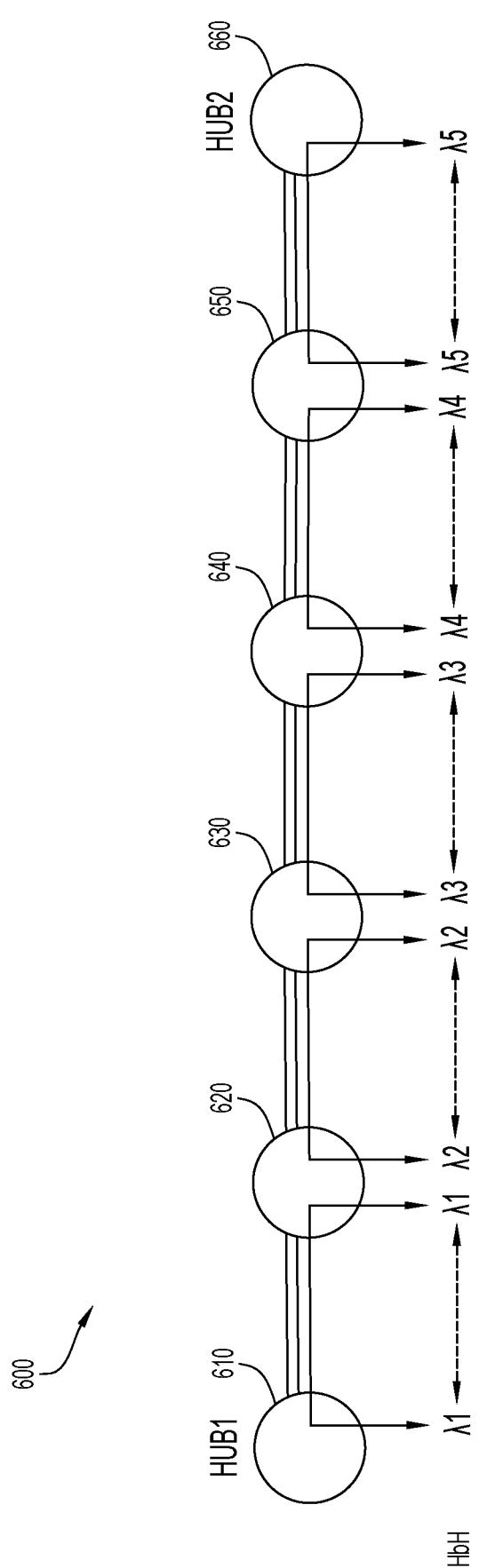
FIG. 6 illustrates an example of provisioning optical channels for hop-by-hop routing, according to an example embodiment.
Figure 7:
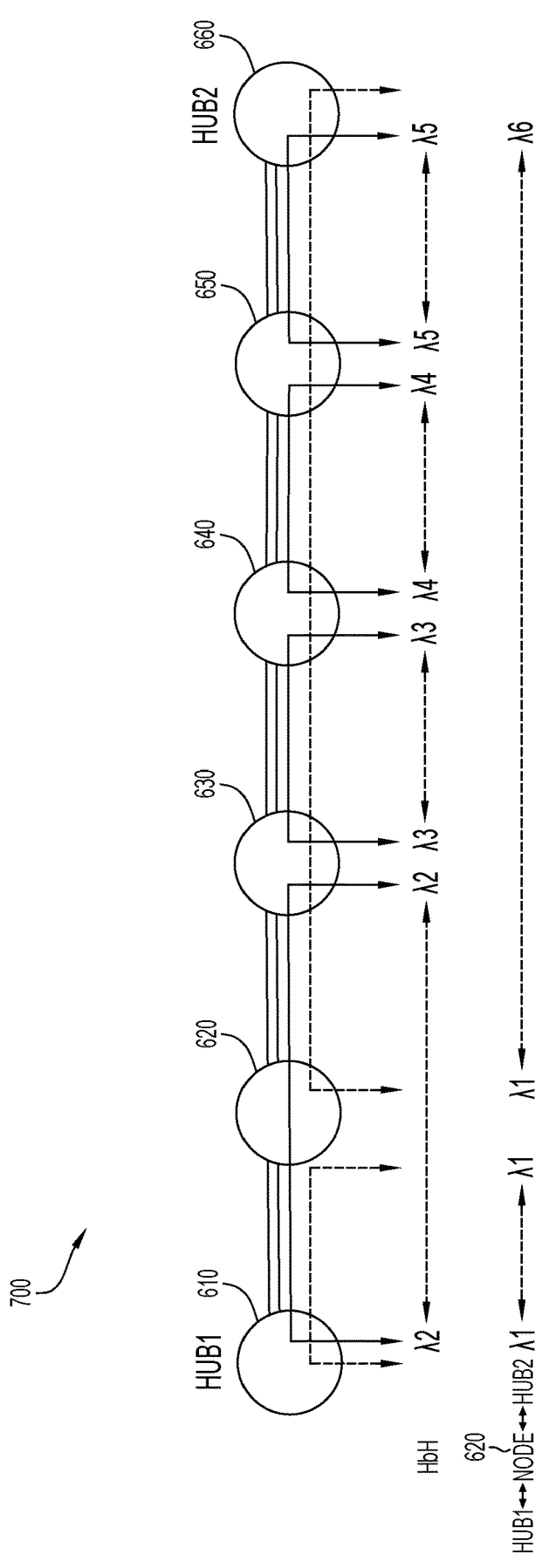
FIG. 7 illustrates an example of provisioning optical channels for migrating an optical network node of FIG. 6 to a hub and spoke connection, according to an example embodiment.
Figure 8:
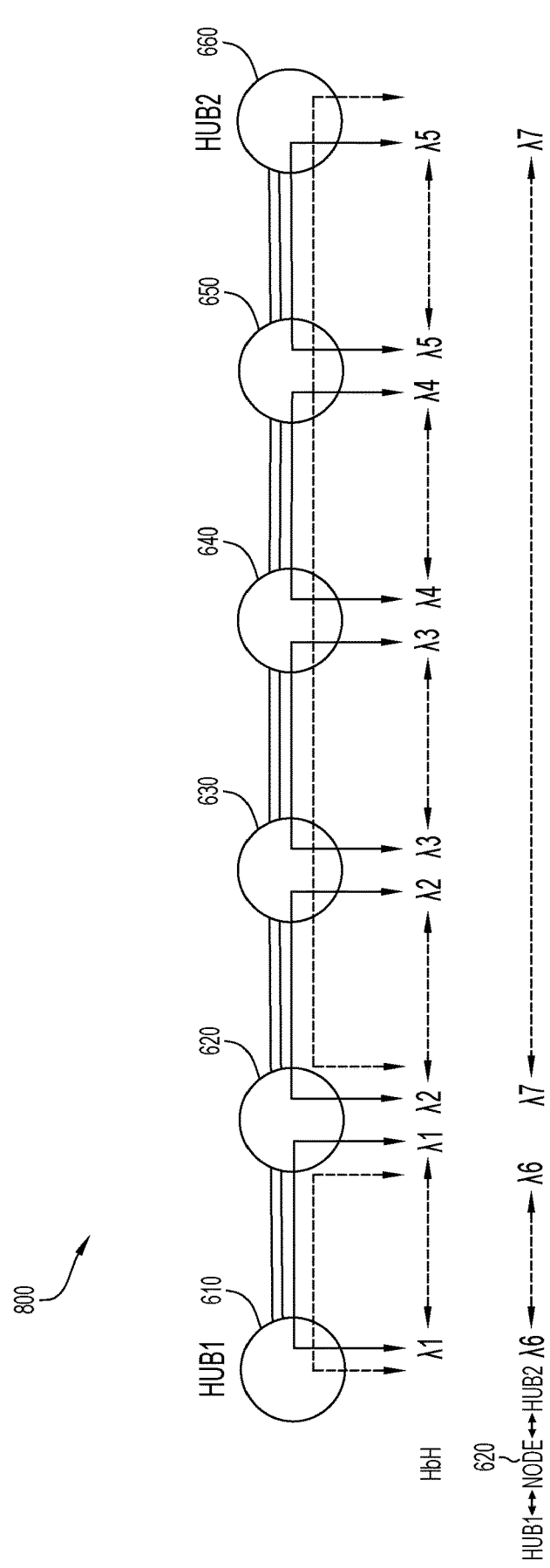
FIG. 8 illustrates another example of provisioning optical channels for providing a hub and spoke connection for an optical network node of FIG. 6, according to an example embodiment.
Figure 9:
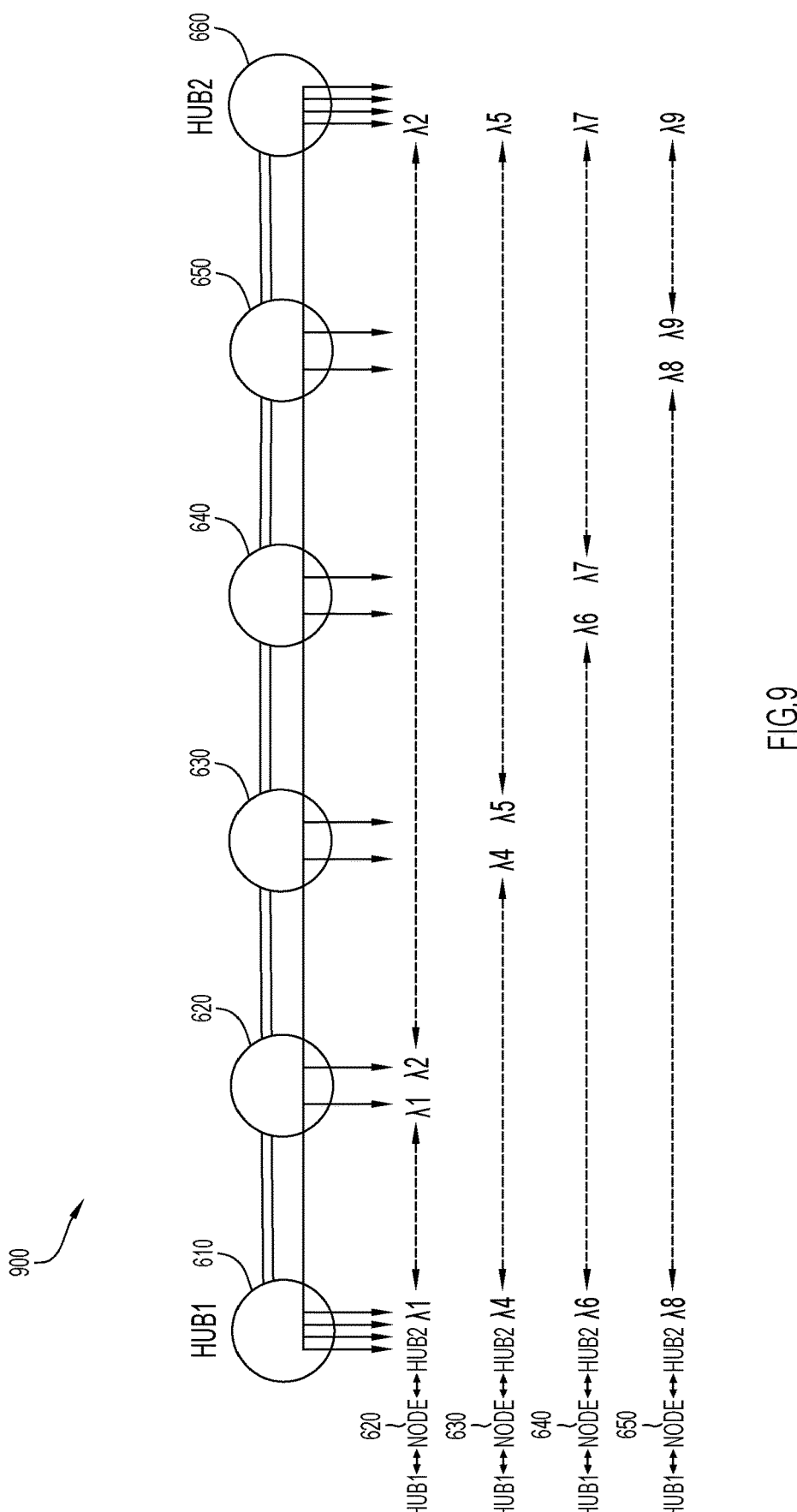
FIG. 9 illustrates an example of provisioning optical channels to form hub and spoke connections for the optical network nodes of FIG. 6, according to an example embodiment.

With continued reference to FIGS. 1 and 2, FIG. 3 illustrates a flowchart of a method 300 for discovering and adjusting mismatched optical channels for an optical network according to an example embodiment. Initially, a digital coherent optics (DCO) module of a router (of environments 100, 200) may be provisioned a channel in various scenarios. For example, the DCO module may be activated after being administratively enabled and assigned a configured wavelength (e.g., indicated in configuration parameters, etc.), traffic patterns may have changed to trigger a re-provisioning for the DCO module, or a command to auto-provision a channel may be received from a network management system.

A receiver (e.g., a receiving router or other network peer in environments 100, 200) performs a sweep of wavelengths within a corresponding band of the receiver to identify used and available channels at operation 310. For example, digital coherent optics (DCO) modules (e.g., in environments 100, 200) may apply optical signal power on corresponding wavelengths or channels (e.g., identified in configuration parameters for the DCO module, provisioned, etc.), and the receiver may measure signal power for the individual wavelengths of the receiver band. The signal power of each wavelength is compared to a threshold to discover or identify which wavelengths or channels contain optical signal power (e.g., the wavelengths having optical signal power exceeding the threshold, etc.). The threshold may correspond to the optical signal power provided by the DCO modules (e.g., an optical signal power level (which may include losses from transmission, etc.)). This identifies initial wavelength channels on the receiver used by the DCO modules.

After a wavelength or channel is identified for a digital coherent optics (DCO) module, the receiver compares the identified wavelength or channel to a locally configured or provisioned wavelength or channel for the receiver at operation 320. When the identified wavelength or channel matches the configured or provisioned wavelength or channel for the receiver, the receiver may perform corresponding actions. For example, when the DCO module is initially enabled, the receiver may activate a corresponding optics controller at operation 340, and subsequent discovery or other operations may be performed using the established channel. Further, communications over the matched wavelength or channel may be initiated when provisioning or re-provisioning is performed in the optical network.

When the identified wavelength or channel for the digital coherent optics (DCO) module does not match the configured or provisioned wavelength for the receiver as determined at operation 330, a manual or automated adjustment or correction may be performed. In addition, an alarm may be reported to a network management system (of environments 100, 200) to indicate that a wavelength mismatch occurred. A user may access or receive the message from the network management system via a user device to view the message. For example, the alarm may provide a notification or message for a user indicating the expected and actual wavelengths or frequencies (e.g., "Wavelength is mismatched for port x, expected lambda 1, actual lambda 2", etc.).

The adjustment or correction may be accomplished in various manners, and may be user-configured on a router. When manual adjustment or correction is configured, a user proceeds to change the wavelength manually on one router to match the wavelength of its peer (e.g., via a user device accessing the router or a network management system, etc.). For example, a user may manually reconfigure the configured or provisioned wavelength for the receiver to match the identified wavelength or channel at operation 345. The receiver verifies the configuration (e.g., ensures the actual channel matches the configured or provisioned channel in substantially the same manner described above). Once the manual adjustment or correction is performed and verified, the receiver may perform various actions in substantially the same manner described above (e.g., the receiver may activate the corresponding optics controller and subsequent discovery or other operations may be performed using the established channel, enable communications over the matched channel or wavelength from provisioning or re-provisioning, etc.).

When automated adjustment or correction is configured (e.g., which may be a system default), the system (e.g., router or network management system) attempts to correct the mismatch at operation 350. For example, the network management system and/or the routers of environments 100, 200 may automatically reconfigure the configured or provisioned wavelength for the receiver to match the identified wavelength or channel. Once the automated adjustment or correction is performed, the receiver may perform various actions in substantially the same manner described above (e.g., the receiver may activate the corresponding optics controller and subsequent discovery or other operations may be performed using the established channel, enable communications over the matched channel or wavelength from provisioning or re-provisioning, etc.). When the automated adjustment or correction is aborted or otherwise cannot resolve the inconsistency, a manual adjustment or correction may be employed in substantially the same manner described above.

In the event that no wavelength or channel is configured or provisioned for the receiver, the identified wavelength is considered matched and becomes the selected wavelength for the receiver (e.g., assigned as the configured or provisioned wavelength or channel for the receiver). This provides automatic channel identification and selection for the receiver. The identified wavelength may also become the selected wavelength for the receiver (e.g., assigned as the configured or provisioned wavelength or channel for the receiver) in response to a command from a network management system (e.g., to auto-provision a channel, etc.).

The sweeping may be performed in substantially the same manner described herein each time a digital coherent optics (DCO) module is powered up, periodically (e.g., every 30 seconds or other time interval), until the initial channel is established, or per user command or network management system action. When no optical signal with sufficient optical power is detected on the wavelengths within the band for a DCO module (e.g., after sweeping through the band, etc.), an alarm or message providing notification of an absence of a signal is generated and provided to the network management system of environments 100, 200 for viewing by the user via the user device, and a wait occurs until a next sweeping cycle.

With continued reference to FIGS. 1-3, FIG. 4 illustrates a flowchart of a method 400 for identifying an available optical channel according to an example embodiment. The identification of a channel for a digital coherent optics (DCO) module of a router (of environments 100, 200) may be performed for various scenarios. For example, the DCO module may be activated after being administratively enabled, traffic patterns may have changed to trigger a re-provisioning for the DCO module, a command for auto-provisioning may be received from a network management system, etc. The identification (or sweeping) may be applied to provisioning, such as changing wavelength routing, or re-provisioning for re-discovery of channels. Method 400 may correspond to operation 310 of FIG. 3.

The identification (or sweeping) determines channels in use and available channels (since there may be existing wavelengths in a splitter based network). The identification or sweeping leverages coherent technology in which optics on the receiver side have a local oscillator that aligns with an incoming signal to amplify the incoming signal. This helps to properly identify the wavelength. By way of example, method 400 is described with respect to networks with broadcast transmissions. However, method 400 may be applied to networks with any types of transmissions.

Initially, a transmitter (e.g., a digital coherent optics (DCO) module on a first router that performs the transmitting function in environments 100, 200) is disabled and a receiver (e.g., a digital coherent optics (DCO) module performing the receiver function on a second router that connects to the transmitter on the same line as the peer of the transmitter in environments 100, 200) checks transmissions on the receiver at operation 405. The receiver sweeps and examines channels or wavelengths within an entire band or spectrum (e.g., C band, etc.) at operation 410, and identifies the channels that are in use and the channels that are available at operation 415. In other words, the receiver identifies an available wavelength or channel (or spectrum of channels) based on the sweeping. For example, the receiver may identify channels based on optical signal power as described above (e.g., channels with optical signal power equal to or exceeding a threshold may be considered in use, channels with optical signal power below the threshold may be considered available, etc.).

The receiver transmits (now performing transmitting function on another line) on the available wavelength (or spectrum) at operation 420 to the transmitter. The receiver monitors for a response from the transmitter on the available wavelength (or spectrum) within a wait time period at operation 425. In other words, the receiver performs the sweeping, and monitors a response from the transmitter. When a correct wavelength is locked by the transmitter, the correct wavelength is transmitted from the transmitter (in the response) to the receiver. If a response is received, the wavelength or channel is verified and subsequent actions for the channel may be performed (e.g., provisioning the channel for communications, optics controller may be initiated, etc.). Otherwise, when no response is received, the sweeping sequence is repeated at operation 410 after a random time interval.

The sweeping mechanism described above discovers optical wavelengths which allows wavelength programming without assignment in advance. As needs change, new wavelength routing can be provisioned on the same network, thereby providing Reconfigurable Optical Add/Drop Multiplexer (ROADM)-like functionality (with existing components lacking such capability).

In a broadcast network use case, all wavelengths are available to the digital coherent optics (DCO) modules. Each DCO module can independently discover which channel is in use through the sweeping mechanism (e.g., receiver wavelength scanning, discovery of wavelength that is in use, provisioning of a new wavelength (not in use), etc.). This sweeping mechanism is also applicable to fixed filter and Reconfigurable Optical Add/Drop Multiplexer (ROADM) networks.

With continued reference to FIGS. 1-4, FIG. 5 illustrates a flowchart of a method 500 for adjusting a mismatched optical channel according to an example embodiment. This may correspond to operation 350 of FIG. 3. Initially, automated adjustment or correction may be configured and performed in response to the identified wavelength or channel not matching the configured or provisioned wavelength or channel. In particular, routers (of environments 100 or 200) are assigned priority at operation 505. In one embodiment, router peers perform a peer priority process to determine which peer adjusts its wavelength configuration to avoid a race condition. One router or peer may be referred to as a primary peer and other routers or peers are referred to as secondary peers. With respect to this adjustment or correction, there is basically no difference as to which peer is designated as the primary peer. Even if an incorrect, but matching, wavelength is selected due to incorrect peer priority, the peers are able to establish the initial channel to allow more sophisticated protocols or the network management system (e.g., via software packages, etc.) to correct the issue.

The priority can be determined in advance either through user configuration (e.g., at the router level) or through automated arbitration via an out-of-band link, such as a router management network or another interface. A number of arbitration parameters can be employed, including IP addresses, router IDs, chassis IDs, Link Layer Discovery Protocol (LLDP) IDs, etc. In one embodiment, a higher addressed router is designated as a primary peer. If no mechanisms exist to automatically determine the priority, routers abort the automated adjustment or correction, and may generate a corresponding notification or message indicating termination of the automated adjustment or correction and requesting manual adjustment or correction (e.g., "Wavelength correction aborted for port x due to unknown peer priority. Manual correction required", etc.). A user may manually adjust or correct the wavelength in substantially the same manner described above.

Once the routers are designated (e.g., as primary or secondary) based on priority, adjustment or correction of the configured or provisioned wavelength is performed at operation 510 (e.g., to align the wavelengths, etc.). Correction may be accomplished by the routers (or network management system) adjusting a port wavelength of a secondary peer to match that of a primary peer in substantially the same manner described above. Once the adjustment is performed, the router or network management system generates and sends a notification or message at operation 515. The notification or message indicates that a correction or adjustment for a corresponding port has been performed (e.g., "Wavelength correction completed for port x", etc.). The message may be accessed or received by a user via a user device (e.g., in communication with the router or network management system, etc.)

Once the wavelength is matched between the router peers, various actions may be performed. For example, the routers may proceed to initiate the corresponding optics controllers. Since the initial channel is operating between the router peers, higher layer communication protocols may begin, such as for further discovery. Further, communications may be enabled between the router peers over the matched wavelength from a provisioning or re-provisioning.

The techniques described herein may be used to configure optical networks for various arrangements. With continued reference to FIGS. 1-5, FIG. 6 illustrates an example of provisioning optical channels of an optical network 600 for hop-by-hop routing, according to an example embodiment. Initially, optical network 600 includes nodes (e.g., routers, etc.) 610, 620, 630, 640, 650, and 660, where nodes 610 (e.g., HUB1 as viewed in FIG. 6) and 660 (e.g., HUB2 as viewed in FIG. 6) are designated as potential hubs. The optical network includes a series of different optical channels (or wavelengths) for communication between each pair of nodes. Each node may discover (or sweep) and provision a corresponding available wavelength for communication with another node in substantially the same manner described above. By way of example, wavelength λ1 may be used for communication between nodes 610 and 620, wavelength 22 may be used for communication between nodes 620 and 630, wavelength λ3 may be used for communication between nodes 630 and 640, wavelength λ4 may be used for communication between nodes 640 and 650, and wavelength λ5 may be used for communication between nodes 650 and 660. This arrangement represents an initial hop-by-hop (HbH) routing configuration since channels exist between each of adjacent nodes. The wavelength and local traffic are aggregated at each node and sent to the adjacent node. This arrangement is used when no node has the capacity to completely fill, and conserves interfaces.

With continued reference to FIGS. 1-6, FIG. 7 illustrates an example of provisioning optical channels of an optical network 700 for migrating an optical network node to a hub and spoke connection according to an example embodiment. Initially, optical network 700 is substantially similar to optical network 600 described above, and includes nodes (e.g., routers, etc.) 610, 620, 630, 640, 650, and 660. Nodes 610 (e.g., HUB1 as viewed in FIG. 7) and 660 (e.g., HUB2 as viewed in FIG. 7) are designated as hubs as described above. The optical network includes a series of different optical channels (or wavelengths) for communication between the nodes as described above. In this example case, network traffic increases to trigger a re-provisioning for node 620 (e.g., by the network management system or nodes) to receive increased capacity. Accordingly, node 620 is migrated from the hop-by-hop (HbH) routing of FIG. 6 to a hub and spoke connection (e.g., each hub being coupled to node 620, HUB1↔Node 620↔HUB2, as viewed in FIG. 7).

Optical network 700 may initially be configured for hop-by-hop (HbH) routing described above for FIG. 6. For example, node 620 may have communication channels to each of adjacent nodes 610 and 630. In order to migrate node 620 to a hub and spoke connection, node 620 is provisioned a channel to each hub (e.g., node 610 (HUB1) and node 660 (HUB2)). Each node may discover (or sweep) and provision a corresponding available wavelength for communication with another node in substantially the same manner described above. In this example case, wavelength λ1 may still be used for communication between nodes 620 and node 610 (HUB1). However, wavelength λ2 may now be used for communication between node 610 (HUB1) and node 630 (e.g., replacing the channels between node 610 and node 630). The channels between nodes 630 and 660 may remain in a hop-by-hop (HbH) arrangement as described above for FIG. 6. In addition, an available wavelength λ6 may be identified and used for communication between nodes 620 and 660 (HUB2), thereby providing node 620 in a hub and spoke connection with channels to each of the hubs (e.g., nodes 610 (HUB1) and 660 (HUB2)) for increased capacity.

With continued reference to FIGS. 1-7, FIG. 8 illustrates another example of provisioning optical channels for providing a hub and spoke connection for an optical network node according to an example embodiment. Initially, optical network 800 is substantially similar to optical network 600 described above, and includes nodes (e.g., routers, etc.) 610, 620, 630, 640, 650, and 660. Nodes 610 (e.g., HUB1 as viewed in FIG. 8) and 660 (e.g., HUB2 as viewed in FIG. 8)

are designated as hubs as described above. The optical network includes a series of different optical channels (or wavelengths) for communication between the nodes as described above. In this example case, network traffic increases to trigger a re-provisioning for node 620 (e.g., by the network management system or nodes) to receive increased capacity. Accordingly, node 620 is provided a hub and spoke connection (e.g., each hub being coupled to node 620, HUB1 ↔Node 620↔HUB2, as viewed in FIG. 8) in addition to the hop-by-hop (HbH) routing.

Optical network 800 may initially be configured for hop-by-hop (HbH) routing described above for FIG. 6. For example, node 620 may have communication channels to each of adjacent nodes 610 and 630. In order to provide node 620 with a hub and spoke connection, node 620 is further provisioned a channel to each hub (e.g., node 610 (HUB1) and node 660 (HUB2)). Each node may discover (or sweep) and provision a corresponding available wavelength for communication with another node in substantially the same manner described above. In this example case, instead of disconnecting the channel between node 620 and node 630 described above for FIG. 7 (e.g., removing node 620 from the hop-by-hop (HbH) routing), a new available wavelength λ6 may be identified and used for communication between nodes 620 and node 610 (HUB1). In addition, a new available wavelength λ7 may be identified and used for communication between nodes 620 and 660 (HUB2), thereby providing a hub and spoke connection for node 620 in addition to the hop-by-hop (HbH) routing.

With continued reference to FIG. 1-8, FIG. 9 illustrates an example of provisioning optical channels to form hub and spoke connections for optical network nodes according to an example embodiment. Initially, optical network 900 is substantially similar to optical network 600 described above, and includes nodes (routers, etc.) 610, 620, 630, 640, 650, and 660. Nodes 610 (e.g., HUB1 as viewed in FIG. 9) and 660 (e.g., HUB2 as viewed in FIG. 9) are designated as hubs as described above. The optical network includes a series of different optical channels (or wavelengths) for communication between the nodes as described above. A hub and spoke arrangement includes each node having channels to each hub such that communications between nodes traverse the hub.

Optical network 900 may initially be configured for hop-by-hop (HbH) routing described above for FIG. 6. In order to migrate the network 900 to hub and spoke connections, each node 620, 630, 640, and 650 is provisioned a channel to each hub (e.g., node 610 (HUB1) and node 660 (HUB2)). Each node may discover (or sweep) and provision a corresponding available wavelength for communication with a hub in substantially the same manner described above. In this example case, wavelength λ1 may be still be used for communication between nodes 620 and node 610 (HUB1). However, wavelength λ2 may now be used for communication between node 620 and node 660 (HUB2) (e.g., replacing the channels between node 620 and node 660, HUB1↔Node 620↔HUB2 as viewed in FIG. 9). Wavelength 24 may now be used for communication between node 610 (HUB1) and node 630 (e.g., replacing the channels between node 610 and node 630). Wavelength 25 may now be used for communication between node 630 and node 660 (HUB2) (e.g., replacing the channels between node 630 and node 660, HUB1↔Node 630↔HUB2 as viewed in FIG. 9). New available wavelength λ6 may be identified and used for communication between node 610 (HUB1) and node 640 (e.g., replacing the channels between node 610 and node 640). New available wavelength λ7 may be identified and used for communication between node 640 and node 660 (HUB2) (e.g., replacing the channels between node 640 and node 660, HUB1↔Node 640↔HUB2 as viewed in FIG. 9). New available wavelength λ8 may be identified and used for communication between node 610 (HUB1) and node 650 (e.g., replacing the channels between node 610 and node 650). In addition, new available wavelength λ9 may be identified and used for communication between node 650 and node 660 (HUB2) (e.g., replacing the previous channel between node 650 and node 660, HUB1↔Node 650↔HUB2 as viewed in FIG. 9). This provides optical network 900 in a hub and spoke arrangement with channels from each node 620-650 to each of the hubs (e.g., nodes 610 (HUB1) and 660 (HUB2)).

FIG. 10 is a flowchart of an example method 1000 for controlling operation of an optical network. At operation 1005, a wavelength of a first network node is identified for communication over a network with a second network node by sweeping wavelengths of the second network node. At operation 1010, a wavelength of the second network node is adjusted based on the wavelength of the first network node to align wavelengths of the first network node and the second network node for communication.

Figure 11:
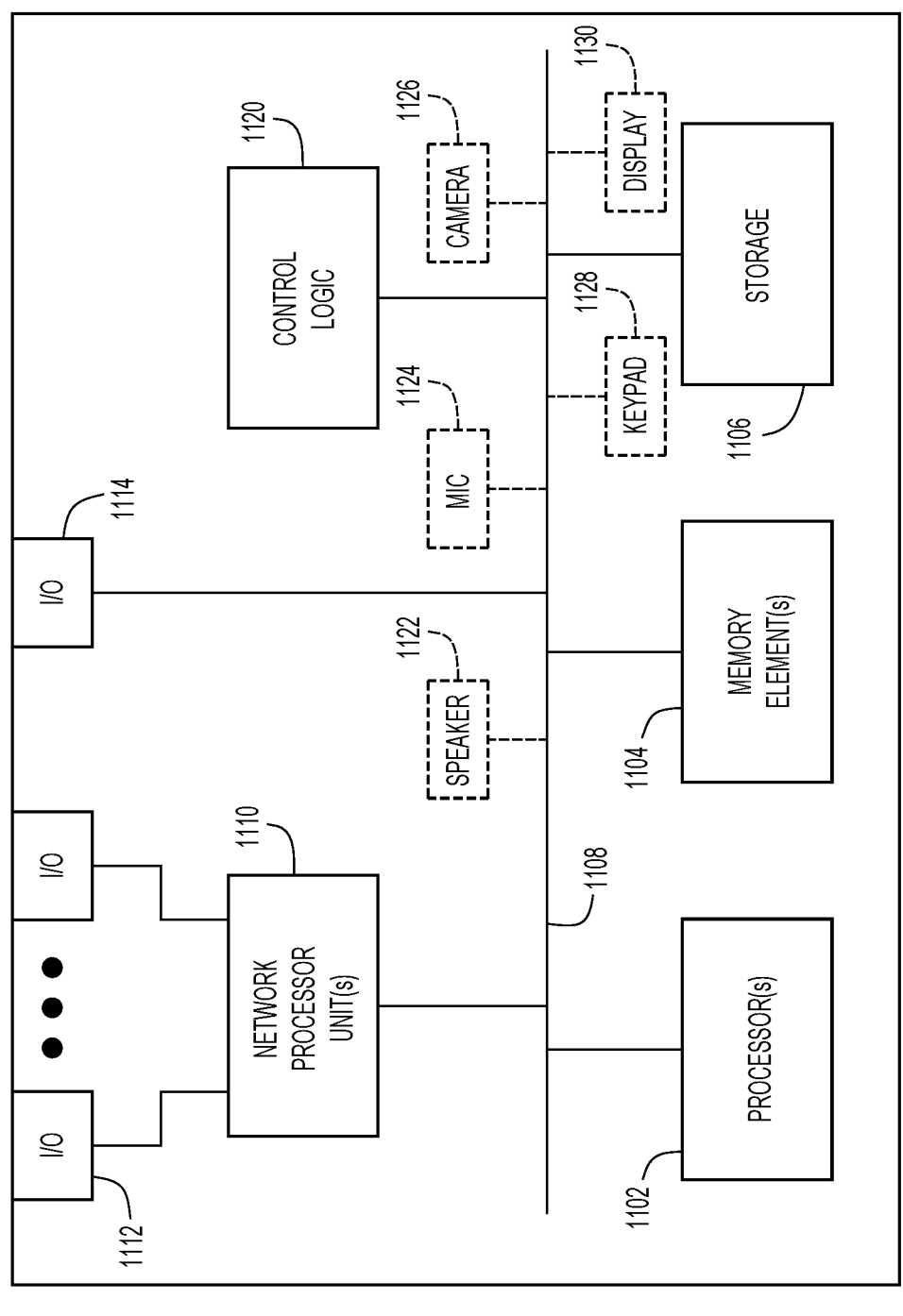
FIG. 11 illustrates a hardware block diagram of a computing device configured to perform functions associated with control of an optical network as discussed herein, according to an example embodiment.

Referring to FIG. 11, FIG. 11 illustrates a hardware block diagram of a computing device 1100 that may perform functions associated with operations discussed herein in connection with the techniques depicted in FIGS. 1-10. In various embodiments, a computing device or apparatus, such as computing device 1100 or any combination of computing devices 1100, may be configured as any device entity/entities (e.g., computer devices, network computing device (e.g., network management system, router, network node, etc.), user device, etc.) as discussed for the techniques depicted in connection with FIGS. 1-10 in order to perform operations of the various techniques discussed herein.

In at least one embodiment, computing device 1100 may be any apparatus that may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., driver(s) optical) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interfaces 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, network computing device, user device, etc.), computing device 1100 may further include, or be coupled to, an audio speaker 1122 to convey sound, microphone or other sound sensing device 1124, camera or image capture device 1126, a keypad or keyboard 1128 to enter information (e.g., alphanumeric information, etc.), and/or a touch screen or other display 1130. These items may be coupled to bus 1108 or I/O interface(s) 1114 to transfer data with other elements of computing device 1100.

In various embodiments, control logic 1120 can include instructions that, when executed, cause processor(s) 1102 to perform operations, which can include, but not be limited to, providing overall control operations of computing device 1100; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory elements 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: identifying a wavelength of a first network node for communication over a network with a second network node by sweeping wavelengths of the second network node; and adjusting a wavelength of the second network node based on the wavelength of the first network node to align wavelengths of the first network node and the second network node for communication.

In one example, adjusting the wavelength of the second network node comprises automatically adjusting the wavelength of the second network node when the wavelength of the first network node differs from the wavelength of the second network node.

In one example, the network includes at least one optical splitter between the first network node and the second network node.

In one example, the network includes at least one optical filter between the first network node and the second network node.

In one example, the method further comprises adjusting a wavelength of one or more network nodes of the network for communication based on changes in network traffic.

In one example, the method further comprises assigning the wavelength of the first network node to the second network node when no wavelength is designated for the second network node.

In one example, the first network node and the second network node each include a router.

In another form, an apparatus is provided. The apparatus comprises: a network computing device comprising one or more processors configured to: identify a wavelength of a first network node for communication over a network with a second network node by sweeping wavelengths of the second network node; and adjust a wavelength of the second network node based on the wavelength of the first network node to align wavelengths of the first network node and the second network node for communication.

In another form, one or more non-transitory computer readable storage media are provided. The non-transitory computer readable storage media are encoded with processing instructions that, when executed by one or more processors, cause the one or more processors to: identify a wavelength of a first network node for communication over a network with a second network node by sweeping wavelengths of the second network node; and adjust a wavelength of the second network node based on the wavelength of the first network node to align wavelengths of the first network node and the second network node for communication.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
identifying a wavelength of a first network node for communication over a network with a second network node by sweeping wavelengths of the second network node; and
adjusting a wavelength of the second network node based on the wavelength of the first network node to align wavelengths of the first network node and the second network node for communication, wherein adjusting the wavelength of the second network node comprises automatically adjusting the wavelength of the second network node when the wavelength of the first network node differs from the wavelength of the second network node.

2. The method of claim 1 further comprising:
reporting an alarm to a network management system to indicate that a wavelength mismatch occurred when the wavelength of the first network node differs from the wavelength of the second network node.

3. The method of claim 1, wherein the network includes at least one optical splitter between the first network node and the second network node.

4. The method of claim 1, wherein the network includes at least one optical filter between the first network node and the second network node.

5. The method of claim 1, further comprising:
adjusting a wavelength of one or more network nodes of the network for communication based on changes in network traffic.

6. The method of claim 1, further comprising:
assigning the wavelength of the first network node to the second network node when no wavelength is designated for the second network node.

7. The method of claim 1, wherein the first network node and the second network node each include a router.

8. An apparatus comprising:
a network computing device comprising one or more processors configured to perform operations including:
identifying a wavelength of a first network node for communication over a network with a second network node by sweeping wavelengths of the second network node; and
adjusting a wavelength of the second network node based on the wavelength of the first network node to align wavelengths of the first network node and the second network node for communication, wherein adjusting the wavelength of the second network node comprises automatically adjusting the wavelength of the second network node when the wavelength of the first network node differs from the wavelength of the second network node.

9. The apparatus of claim 8, wherein the one or more processors are further configured to perform an operation including:
reporting an alarm to a network management system to indicate that a wavelength mismatch occurred when the wavelength of the first network node differs from the wavelength of the second network node.

10. The apparatus of claim 8, wherein the network includes at least one optical splitter between the first network node and the second network node.

11. The apparatus of claim 8, wherein the network includes at least one optical filter between the first network node and the second network node.

12. The apparatus of claim 8, wherein the one or more processors are configured to perform further operations including:
adjusting a wavelength of one or more network nodes of the network for communication based on changes in network traffic.

13. The apparatus of claim 8, wherein the one or more processors are configured to perform further operations including:
assigning the wavelength of the first network node to the second network node when no wavelength is designated for the second network node.

14. One or more non-transitory computer readable storage media encoded with processing instructions that, when executed by one or more processors, cause the one or more processors to perform operations including:
identifying a wavelength of a first network node for communication over a network with a second network node by sweeping wavelengths of the second network node; and
adjusting a wavelength of the second network node based on the wavelength of the first network node to align wavelengths of the first network node and the second network node for communication, wherein adjusting the wavelength of the second network node comprises automatically adjusting the wavelength of the second network node when the wavelength of the first network node differs from the wavelength of the second network node.

15. The one or more non-transitory computer readable storage media of claim 14, further comprising instructions that cause the one or more processors to perform an operation including:
reporting an alarm to a network management system to indicate that a wavelength mismatch occurred when the wavelength of the first network node differs from the wavelength of the second network node.

16. The one or more non-transitory computer readable storage media of claim 14, wherein the network includes at least one optical splitter between the first network node and the second network node.

17. The one or more non-transitory computer readable storage media of claim 14, wherein the network includes at least one optical filter between the first network node and the second network node.

18. The one or more non-transitory computer readable storage media of claim 14, wherein the processing instructions cause the one or more processors to perform further operations including:
adjusting a wavelength of one or more network nodes of the network for communication based on changes in network traffic.

19. The one or more non-transitory computer readable storage media of claim 14, wherein the processing instructions cause the one or more processors to perform further operations including:
assigning the wavelength of the first network node to the second network node when no wavelength is designated for the second network node.

20. The one or more non-transitory computer readable storage media of claim 14, wherein the first network node and the second network node each include a router.

* * * * *